United States Patent
Terada et al.

[11] Patent Number: 5,882,758
[45] Date of Patent: Mar. 16, 1999

[54] OPTICAL RECORDING MEDIUM

[75] Inventors: Masato Terada; Kazuyuki Furuya; Tatsuya Okamura; Masaru Suzuki, all of Shizuoka, Japan

[73] Assignee: Asahi Kasei Kogyo Kabushiki, Osaka, Japan

[21] Appl. No.: 849,200
[22] PCT Filed: Nov. 22, 1995
[86] PCT No.: PCT/JP95/02381
   § 371 Date: May 27, 1997
   § 102(e) Date: May 27, 1997
[87] PCT Pub. No.: WO96/17344
   PCT Pub. Date: Jun. 6, 1996

[30] Foreign Application Priority Data

Nov. 28, 1994 [JP] Japan .................................. 6-292722

[51] Int. Cl.$^6$ ........................................ B32B 3/00
[52] U.S. Cl. ................... 428/64.1; 428/64.4; 428/64.5; 428/64.7; 428/457; 428/913; 430/270.13; 430/495.1; 430/945; 369/283; 369/288
[58] Field of Search ............... 428/64.1, 64.2, 428/64.4, 64.5, 64.7, 457, 913; 430/270.12, 270.13, 495.1, 915; 369/283, 288

Primary Examiner—Elizabeth Evans
Attorney, Agent, or Firm—Birch, Stewart, Kolasch & Birch, LLP

[57] ABSTRACT

A phase-change type optical recording medium, wherein (1) recording, erasing and reading of information by irradiating light is possible, and the medium has a structure in which a first protective layer, a recording layer, a second protective layer, and a reflective layer are consecutively deposited in this order on a transparent substrate, (2) the thickness of the first protective layer is in the range of the thickness, where reflectivity of light on irradiating the layer from the side of the transparent substrate exhibits a minimum, ±30 nm, and (3) the second protective layer has the absorption coefficient k satisfying the equation as follows $$0.05 \leq k \leq 2.5.$$

According to the present invention, unevenness of shapes and sizes of the recording pits can be reduced, irrespective of whether the state of the recording layer is crystalline or amorphous. Resultantly, the present invention can provide an optical recording medium having an improvement in erasability and reduction of jitter, and having excellent error rate.

15 Claims, 5 Drawing Sheets

OPTICAL RECORDING MEDIUM

TECHNICAL FIELD

The present invention relates to an optical recording medium, wherein recording, erasing and reading of information by irradiating light is possible, and the recording and erasing of signals are conducted by phase changing.

More specifically, the present invention relates to a phase-change type optical recording medium, wherein recording, erasing and reading of information by irradiating light is possible, and the medium has a structure in which the first protective layer, a recording layer, the second protective layer, and a reflective layer are consecutively deposited in this order on a transparent substrate, the thickness of the first protective layer is in a specified range, further the second protective layer has an absorption coefficient k in a specified range.

According to the optical recording medium of the present invention, unevenness of shapes and sizes of the recording pits can be reduced, whether the state of the recording layer is crystalline or amorphous. As a result, the present invention can provide an optical recording medium having an improvement in erasability and reduction of jitter, and having an excellent error rate.

BACKGROUND OF THE ART

Recently, optical recording media have been paid attention as a material playing a centric role among recording media in a highly information-oriented society, and research thereof has been positively promoted.

Especially, optical-disk among optical recording media are paid attention as the most effective recording medium with the spread of multi-media for the future.

The optical-disk as mentioned above include three types, i.e., the read-only type as represented by a compact disk and a laser disk, the write-once type in which writing of information by a user is possible, and the rewritable type in which rewriting of information is possible. Among them, the rewritable type includes a magnetic optical system and a phase-change system, and in the phase-change system, the material in which the phase change between a crystalline state and an amorphous state is caused, is employed as the recording layer.

Figure 2:
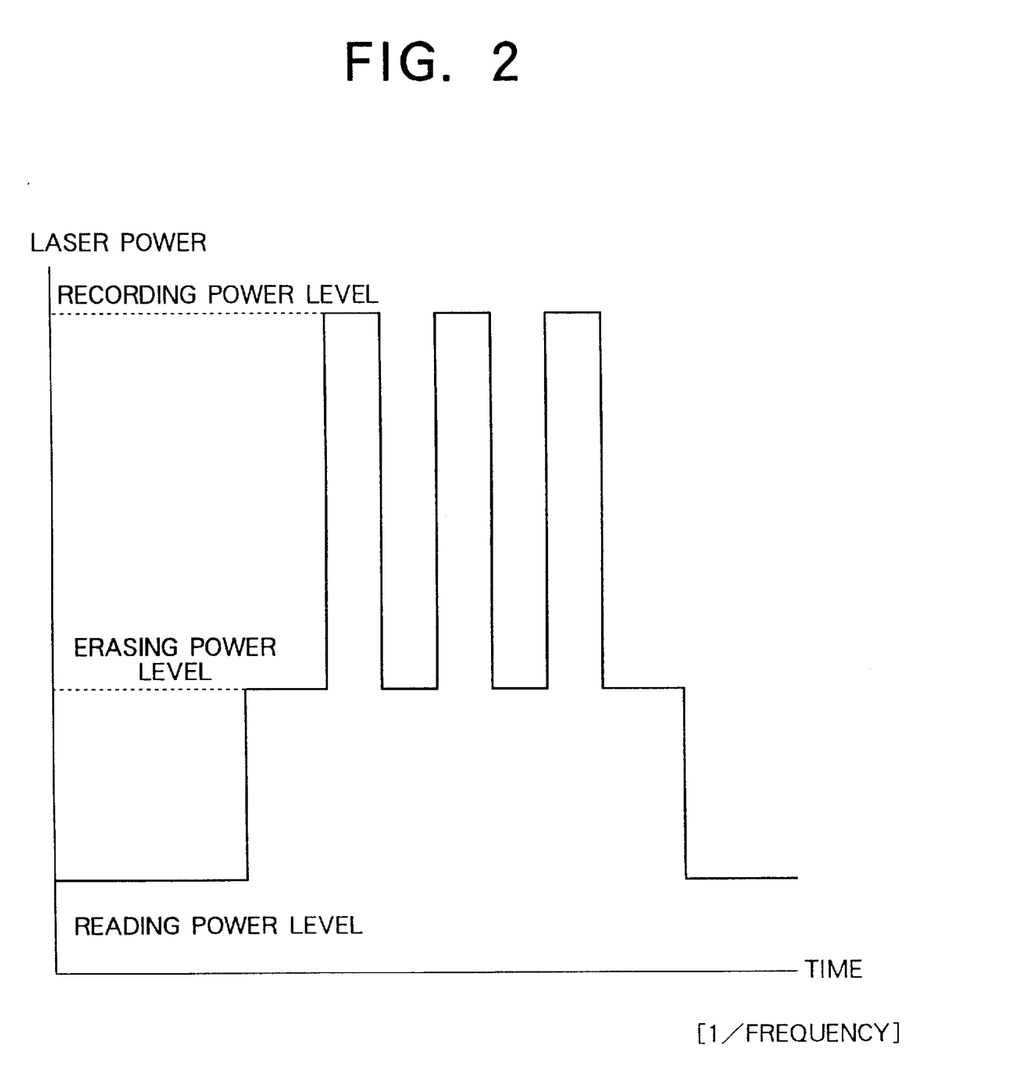
FIG. 2 is a waveform showing intensity of a laser beam on overwriting.

In the phase-change system, overwriting is easily possible by irradiating to the recording layer a laser beam the intensity of which is modulated according to recording signals as shown in FIG. 2. That is to say, at the spot where a laser beam having strong power is irradiated for a short time, a material of the recording layer is rapidly heated and melted, and then rapidly cooled, and thereby an amorphous state (a recording pit) is formed, on the other hand, at the spot where a laser beam having power weaker than that is irradiated, the material is raised in temperature to a temperature range which is lower than the melting point thereof and wherein crystallization thereof is possible, and thereby a crystalline state thereof is formed.

Figure 1:
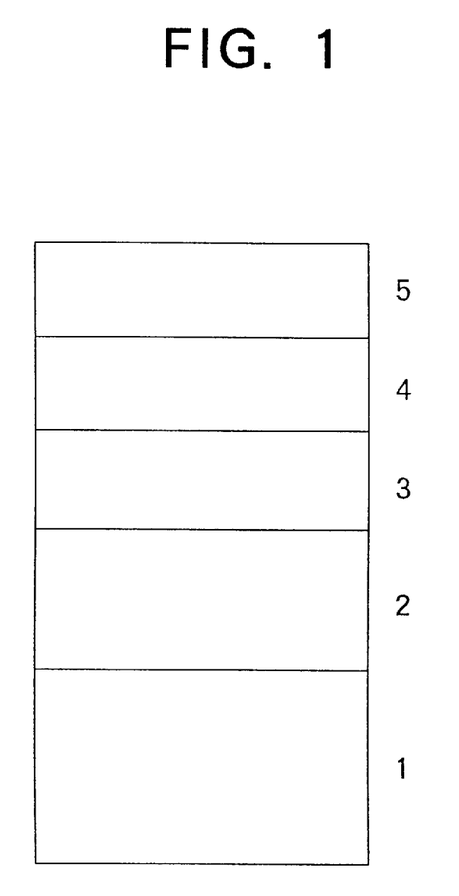
FIG. 1 is a view showing the structures of the optical recording media of the present invention and of prior art.

Conventionally, in phase-change type optical disk, the amplitude of signals is made to be large, or the functions on the repeated use thereof are aimed to improved; therefore a structure having four layers on a transparent substrate as shown in Fig.1 is mainly used. That is the structure of four layers, wherein on the transparent substrate 1 such as a polycarbonate resin, the transparent first protective layer 2, a recording layer 3, the second protective layer 4, and a reflective layer 5 are consecutively provided, and a transparent material similar to that of the first protective layer is usually used for the second protective layer.

As the protective layer, a mixture of chalcogen compound and oxides, a mixture of nitrides, or the like such as $ZnS-SiO_2$ is popular and widely used, since they have an excellent protective property on the recording layer, and a mechanical property adequately durable to the repeating of recording and erasing.

Heretofore, for the purpose of improving the recording sensitivity of a phase-change type optical recording medium, a structure has been proposed wherein a protective layer absorptive of light, such as a layer in which metal is dispersed in a dielectric, is provided as the second protective layer on the upper side of the recording layer. This is a technique wherein crystallization or amorphization of a recording layer is accelerated due to the absorbed heat which is generated by absorbing a light transmitted through the recording layer with the protective layer absorptive of light.

However, though the proposal is effective in improving the recording sensitivity, it has not yet resulted in reducing the unevenness of shapes and sizes of recording pits by making the amount of light absorption in a crystalline state larger than the amount of light absorption in an amorphous state, respectively, in the recording layer. Thus a material exhibiting sufficiently low jitter, on high densification thereof, has not been available, which has been a problem.

For instance, as to the structure wherein carbon is used as a material of the second protective layer, and the carbon layer is deposited on the recording layer, there have been a proposal aiming at improving the recording sensitivity (Japanese Patent Laid-Open Publication HEI No.3(1991)-100,936), and a proposal aiming at improving the durability to repeated use (U.S. Pat. No. 5,294,523; corresponding Japanese Patent Laid-Open Publication HEI No. 2(1990)-139,283).

Japanese Patent Laid-Open Publication HEI No. 3(1991)-100,936 relates to a structure wherein a carbon layer is deposited on a recording layer at the thickness in the range of 50 nm to 500 nm. However, in case of the structure wherein a reflective layer is provided on the carbon layer, in that range of thickness, an optical contrast thereof becomes low, and a ratio of intensities of a carrier to a noise (a C/N ratio) cannot sufficiently be obtained. Moreover, since thickness of the carbon layer is large so as to provide a structure of gradual cooling, a temperature distribution on the surface of the recording layer becomes steep, such that the residual fault of erasing at a pit end tends to be caused, and a decrease in erasability comes out. Further, due to the gradually cooled structure, a material flow in the recording layer depending upon the repeating of recording and erasing, such as a large change of a thickness of the layer, occurs, which has been a problem.

U.S. Pat. No. 5,294,523 describes a structure wherein a carbon layer having a thickness not larger than 10 nm is provided that contacts with the recording layer. Therein, the following is described. Since the melting point of carbon is high, the carbon added in the recording layer, or the carbon residing at the interface with the recording layer is not melted upon irradiation of a laser beam, so as to prevent the material flow of elements composing the recording layer during the repeating of recording and erasing. However, only providing a carbon layer contacting with the recording layer has not yet resulted in reducing the unevenness of shapes and sizes of recording pits by making the amount of light absorption in a crystalline state larger than the amount of light absorption in an amorphous state, respectively, in the recording layer, and thus a material exhibiting sufficiently low jitter has not been available, which has been a problem.

Generally, in a phase-change type optical recording medium, the recording layer in a crystalline state has high thermal conductivity as compared with that in an amorphous state, and requires for melting a thermal amount corresponding to a latent heat, and therefore that in a crystalline state requires a high thermal amount to form a recording pit as compared with that in an amorphous state.

Therefore, in order to form recording pits having the same size irrespective of whether the state of the recording layer before recording is crystalline or amorphous when overwriting is conducted, it is desirable that the amount of light absorption in a crystalline state is larger than the amount of light absorption in an amorphous state.

Figure 3:
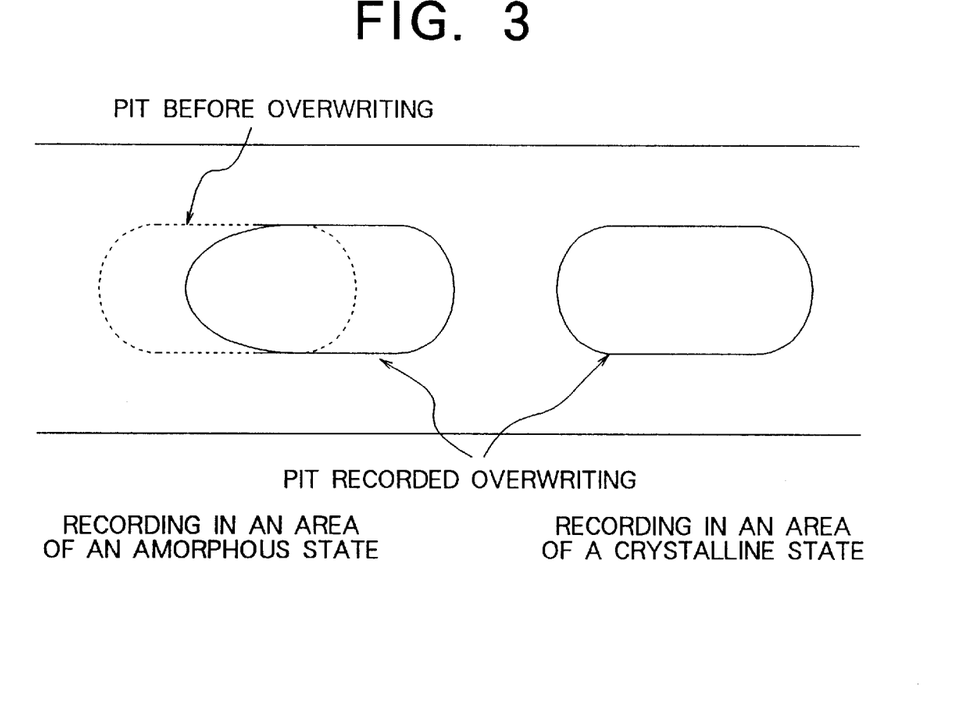
FIG. 3 is an explanatory view showing shapes of pits formed in the optical recording medium of prior art when recording is conducted in the areas of an amorphous state and a crystalline state.

However, in the conventional phase-change type optical recording medium having a four-layered structure, the amount of light absorption in an amorphous state becomes larger than the amount of light absorption in an crystalline state, such that, as shown in Fig. 3, the recording pit which has been overwritten in an area of an amorphous state before recording becomes to have a different shape or size from the recording pit which has been overwritten in an area of a crystalline state before recording. That is to say, the recording pit which has been overwritten in an area of an amorphous state becomes to have a melted area larger than that which has been overwritten in an area of a crystalline state, and, as a result, a pit having a shape different from the desired shape tends to be formed, which has been a problem.

Especially, in the pit edge recording which is a main stream of a technique of high densification, data are marked on both ends of a pit, and therefore unevenness of shapes or sizes of a recording pit directly results in an error, which has been a large factor obstructing an improvement in recording density of a phase-change type optical recording medium.

DISCLOSURE OF THE INVENTION

The object of the present invention is to provide a phase-change type optical recording medium wherein unevenness of shapes and sizes of the recording pits can be reduced, irrespective of whether the state of the recording layer before recording is crystalline or amorphous, and which exhibits an adequately low jitter, and therefore exhibits excellent error rate.

The present inventors have intensively studied to accomplish the object described above. As a result, they have found that by selecting the thickness of the first protective layer in a specified range, further selecting the absorption coefficient k of the second protective layer in a specified range, so that the object can be attained. Thus the present invention has been accomplished.

That is, the present invention provides, a phase-change type optical recording medium, wherein (1) recording, erasing and reading of information by irradiating light is possible, and the medium has a structure in which the first protective layer, a recording layer, the second protective layer, and a reflective layer are consecutively deposited in this order on a transparent substrate, (2) the thickness of the first protective layer is in the range of the thickness, where reflectivity of light on irradiating the layer from the side of the transparent substrate exhibits a minimum, ±30 nm, and (3) the second protective layer has the absorption coefficient k satisfying the equation as follows.

$$0.05 \leq k \leq 2.5$$

Preferably, the present invention further provides the optical recording medium described above, wherein the thickness of the second protective layer is in the range of 2 nm to 40 nm.

DESCRIPTION OF SYMBOLS

1: a transparent substrate
2: the first protective layer
3: a recording layer
4: the second protective layer
5: a reflective layer

BEST MODE FOR CARRYING OUT THE INVENTION

A material of the transparent substrate used in the phase-change type optical recording medium of the present invention includes transparent materials such as a glass, an acrylic resin, a polycarbonate resin, a polystyrene resin, a polyvinyl chloride resin, an epoxy resin, a polyolefin resin, etc., and among them a polycarbonate resin and an acrylic resin are preferable from the aspect of optical, and mechanical properties.

As a material of the recording layer used in the optical recording medium of the present invention, known materials for the phase-change type optical recording medium are usable, and it includes, for instance, a material comprising as the main component thereof an alloy of Sb-Te-Ge, an alloy of In-Sb, an alloy of In-Sb-Te, an alloy of In-Se, or the like.

The thickness of the recording layer in the optical recording medium of the present invention is preferably in the range of 10 nm to 50 nm. When the thickness of the recording layer is thinner than 10 nm, a difference between reflectivity in an amorphous state and that in a crystalline state becomes small, thereby quality of signals is deteriorated. When the thickness of the recording layer is thicker than 50 nm, the amount of light absorbed in the recording layer in an amorphous state becomes large, and therefore the amount of light absorbed in the recording layer in a crystalline state cannot be made larger than or same the amount of light absorbed in the recording layer in an amorphous state. The thickness of the recording layer is more preferably in the range of 20 nm to 35 nm.

The method for forming the recording layer in the optical recording medium of the present invention is not particularly limitative, and known vapor deposition methods or sputtering method can be employed as the methods.

The protective layer in the optical recording medium of the present invention contains the first protective layer, the second protective layer. And putting the recording layer between them, the layer to the side of the transparent substrate is referred to as the first protective layer, and the layer to the opposite side, namely to the side of the reflective layer, is referred to as the second protective layer.

In the optical recording medium of the present invention, the larger the amount of light which is transmitted through the recording layer in an amorphous state, the more desirable it is, since light is easy tends to be absorbed in the second protective layer absorptive of light. Therefore, the thickness of the first protective layer desirably is chosen such that its reflectivity may exhibit a minimum when light is irradiated from the side of the transparent substrate to the recording layer. Then, it is realizable that the amount of light absorbed in the recording layer in a crystalline state is larger than the amount of light absorbed in the recording layer in an amorphous state.

The reflectivity when light is irradiated from the side of the transparent substrate to the recording layer is generally determined univocally depending upon a refractive index and an absorption coefficient of the transparent substrate, and a thickness, a refractive index and an absorption coefficient of each layer deposited on the substrate according to the wavelength of incident light.

Figure 5:
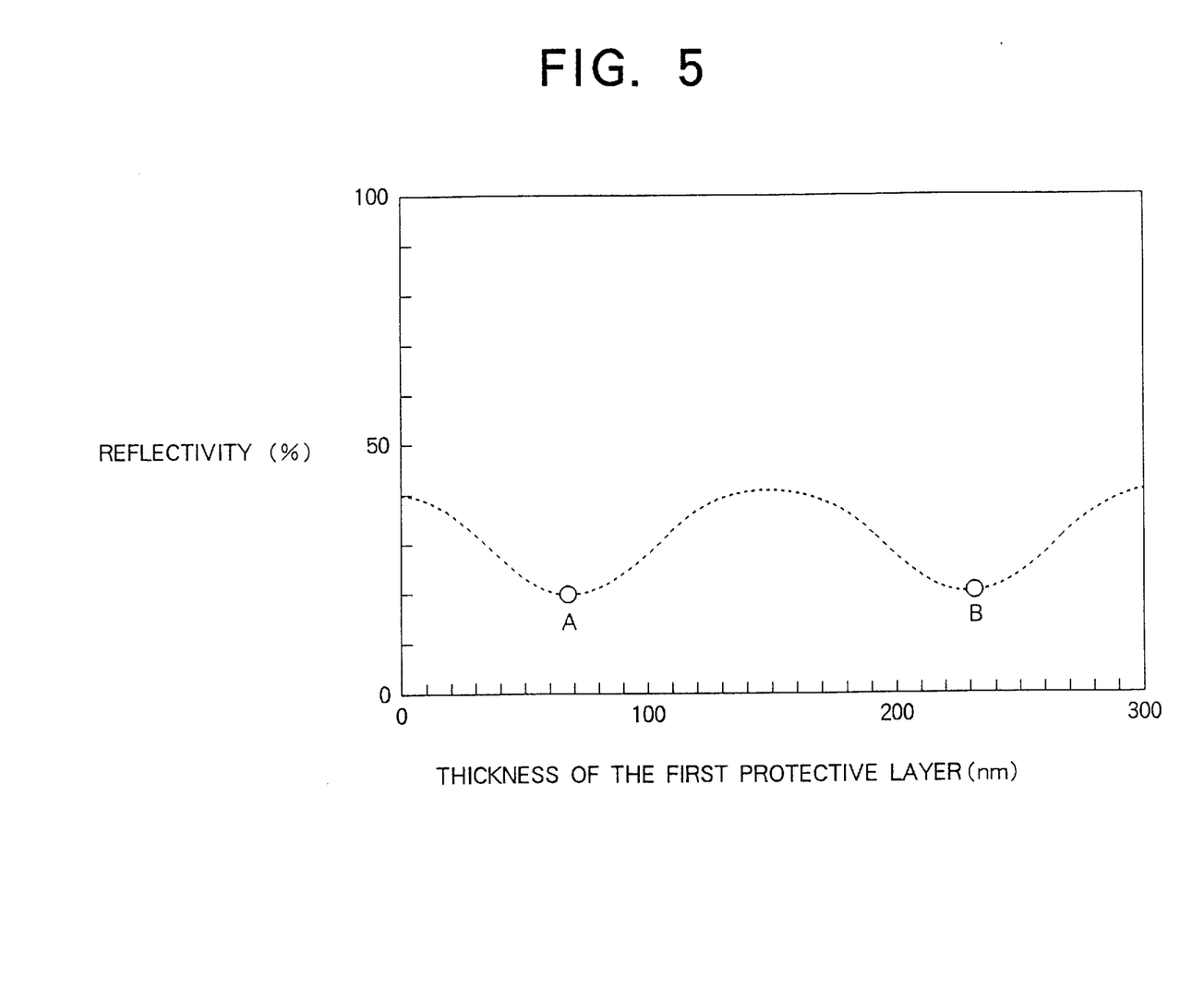
FIG. 5 is a view showing a relation between reflectivity and thickness of the first protective layer in the structure of the optical recording medium of the present invention when light is irradiated to the recording layer from the side of a transparent substrate.

In FIG. 5, one example of a relation between reflectivity and thickness of the first protective layer by simulation in a structure in which the first protective layer, a recording layer, the second protective layer, and a reflective layer are consecutively deposited in this order on a transparent substrate is shown. Herein, as the values of thickness and optical constants (a refractive index and an absorption coefficient) of each layer used in the simulation, those shown in Table 1 below are used. The optical recording medium of the present invention exhibits its effect at the thickness of the first protective layer at which reflectivity exhibits a minimum in FIG. 5, for instance, in the vicinity of A and B. Then, it is possible that the amount of light absorbed in the recording layer in a crystalline state is larger than the amount of light absorbed in the recording layer in an amorphous state. The range of the thickness of the first protective layer wherein the state as above is realizable is approximately the thickness of A and B described above ±30 nm, for instance. When the tolerance of the thickness is beyond the range of the ±30 nm, the amount of light absorbed in the recording layer in an amorphous state becomes to exceed the amount of light absorbed in the recording layer in a crystalline state, and therefore the recording pit which is overwritten in an area of an amorphous state tends to become larger than that which is overwritten in an area of a crystalline state. As a result, sizes and shapes of the recording pits formed after overwriting become uneven, and quality of signals is deteriorated from the viewpoint of erasability and jitter, which is unfavorable. Therefore, the thickness of the first protective layer is required to be chosen in the range of the thickness where reflectivity exhibits a minimum, ±30 nm.

TABLE 1

| Strusture of layers | | Thickness | Refractive index n | Absorption coefficient K |
|---|---|---|---|---|
| Reflective layer | | 150 (nm) | 1.7 | 6.1 |
| Second protective layer | | 20 (nm) | 2.7 | 0.5 |
| Recording layer | Crystalline layer | 25 (nm) | 4.4 | 4.0 |
| | Amorphous state | | 4.2 | 1.7 |
| First protective layer | | — | 2.1 | 0.0 |
| Substrate | | 0.6 (mm) | 1.58 | 0.0 |

The thickness of the first protective layer is preferably in the range of 100 nm to 400 nm, and in the range of the thickness where reflectivity described above exhibits a minimum, ±30 nm. Where the thickness is thinner than 100 nm, thermal damage to the transparent substrate on the repeating of recording and erasing is large, and the quality of signals is deteriorated. On the other hand, where the thickness is thicker than 400 nm, deformation of the substrate is feared to occur, for instance, owing to the affect of heat caused on forming the layer, which is unfavorable.

In the optical recording medium of the present invention, as a material of the first protective layer, known dielectric materials are usable, and they include, for instance, a sulfide, an oxide, a nitride, a fluoride, a carbide, or a mixture thereof such as ZnS, $SiO_2$, SiO, $Al_2O_3$, MgO, $Si_3N_4$, AlN, $MgF_2$, SiC, $ZnS-SiO_2$.

The absorption coefficient k of the second protective layer is required to satisfy the relation of $0.05 \leq k \leq 2.5$. When the absorption coefficient k is lower than 0.05, almost no absorption of a laser light in the second protective layer can be seen, and absorption of light in the recording layer in an amorphous state due to interference of light is caused, and thus it cannot be realized that the amount of light absorbed in the recording layer in an amorphous state does not exceed the amount of light absorbed in the recording layer in a crystalline state. On the other hand, when the absorption coefficient k is higher than 2.5, reflection at the interface between the recording layer and the second protective layer becomes larger, and absorption of a laser light in the recording layer in an amorphous state is not reduced, and thus the amount of the absorption cannot be smaller than the amount of light absorbed in the recording layer in a crystalline state. The absorption coefficient k is preferably in the range of $0.1 \leq k \leq 2.0$.

The thickness of the second protective layer in the optical recording medium of the present invention is preferably in the range of 2 nm to 40 nm. Where the thickness is thinner than 2 nm, the amount of light absorbed in the second protective layer absorptive of light is small, and unevenness of sizes or shapes of recording pits formed by overwriting cannot be reduced. On the other hand, where the thickness is thicker than 40 nm, the optical recording medium becomes to have a structure of gradual cooling, and therefore the remaining of a minute amorphous portion not being erased tends to occur. Thus, a decrease of erasability is caused, and a material flow in the recording layer depending upon the repeating of recording and erasing becomes large, which is unfavorable. Therefore, the thickness of the second protective layer is preferably in the range of 2 nm to 40 nm, and more preferably in the range of 10 nm to 30 nm since it may be difficult to realize an adequate sensitivity of recording and erasing in an area of thinner thickness of the second protective layer.

The second protective layer absorptive of light has not only optical properties but also a role of protecting the recording layer. Therefore, the second protective layer, for stability of data for a long period, is required to have thermal resistance, and to have an excellent adhesive property to the recording layer and barrier property to water. Further, it is required to have high thermal resistance and mechanical strength to attain the durability to the repeating of favorable recording and erasing.

Considering these, a material used for the second protective layer first includes carbon, or a material obtained by adding to carbon at least one sort of a metal or semimetal selected from the group consisting of Al, Ag, W, Ti, Mo, Ni, Pt, Cr, Pd, V, Tc, Nb, Ta, Re, and Ir.

As the method for forming a carbon layer, known methods such as a sputtering method or a vapor deposition method can be employed.

The method for forming a carbon layer to which a metal or semimetal is added includes a co-sputtering method wherein separate targets of carbon and a metal or semimetal are sputtered at the same time, and a method of sputtering a target in which a metal or semimetal is added to carbon, etc. Especially, the co-sputtering method is effective, since a ratio of mixing carbon with a metal or semimetal can be freely varied and therefore a suitable absorption coefficient can be attained.

A material used for the second protective layer secondly is exemplified by $AlN_x$. Therein, x means a ratio of a concentration of N element to a concentration of Al element (x=a concentration of N element/a concentration of Al element). In this case, when $AlN_x$, is stoichiometrically not in a completely stable state, i.e., where a ratio x of a concentration of N element to a concentration of Al element is not higher than 1, the second protective layer becomes not transparent and becomes to have an absorption coefficient k. Thus, by choosing x in the predetermined range, the range of an absorption coefficient k effective in the present invention, i.e., $0.05 \leq k \leq 2.5$ can be attained such that x becomes to be established in the range of approximately 0.5 to 0.9.

The method for forming an $AlN_x$, layer includes a reactive sputtering method wherein an Al target is spattered in a reactive gas containing $N_2$ controlling and the amount of $N_2$ in the reactive gas.

As a material used for the second protective layer, thirdly, a material is also effective wherein a metal or semimetal is added to a sulfide, an oxide, a nitride, a fluoride, a carbide, or a mixture thereof exemplified above concerning the first protective layer used as a matrix material. The metal or semimetal preferably has an absorption coefficient and is an element having a comparatively high melting point, and is preferably at least one selected from the group consisting of Al, Ag, W, Ti, Mo, Ni, Pt, Cr, Pd, V, C, B, PbS, PbSe, PbTe, and $Mg_2Sn$.

The matrix material, as stated above, includes, for instance, a sulfide, an oxide, a nitride, a fluoride, a carbide, or a mixture thereof such as ZnS, $SiO_2$, SiO, $Al_2O_3$, MgO, $Si_3N_4$, AlN, $MgF_2$, SiC, ZnS-$SiO_2$.

The method for forming a layer wherein a metal or semimetal is added to the above-described matrix material includes, as in the method for forming a carbon layer to which a metal or semimetal is added, a co-sputtering method wherein separate targets of the matrix material and a metal or semimetal are sputtered at the same time, and a method of sputtering a target in which a metal or semimetal is added to the matrix material, etc. Especially, the co-sputtering method is effective, since a mixing ratio of the matrix material to a metal or semimetal can be freely varied and therefore a suitable absorption coefficient can be attained.

Figure 4:
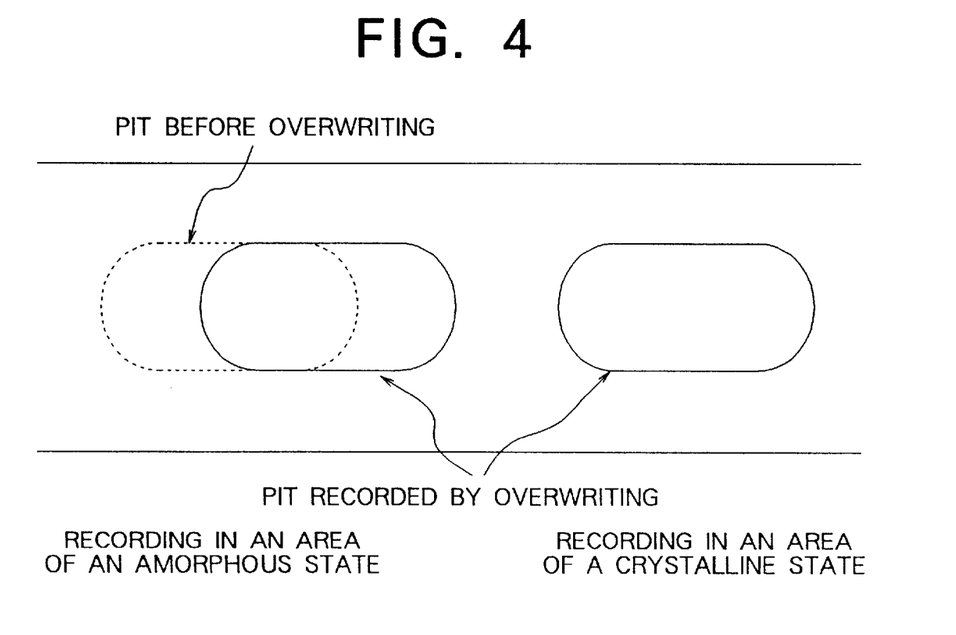
FIG. 4 is an explanatory view showing shapes of pits formed in the optical recording medium of the present invention when recording is conducted in the areas of an amorphous state and a crystalline state.

According to the phase-change type optical recording medium of the present invention, a laser light transmitted through the recording layer in an amorphous state is absorbed in the second protective layer having a property absorptive of light, and the amount of the laser light absorbed in the recording layer in an amorphous state due to interference of the laser light is reduced, and thus it can be realized that the amount of the laser light absorbed does not exceed the amount of light absorbed in the recording layer in a crystalline state. Therefore, unevenness of shapes and sizes of the recording pits can be reduced, irrespective of whether the state of the recording layer is crystalline or amorphous, as shown in FIG. 4.

As a material of the reflective layer of the optical recording medium of the present invention, metals of Al, Ni, Cr, Au, Ti, Cu, Zr, Hf, Si, Mg, etc., and an alloy thereof are preferred from the viewpoint of thermal conductivity and an optical constant. Above all, alloys are more preferred wherein at least one selected from the group consisting of Cr, Ti, Si, Cu, Zr, Hf, etc. is added to Al in the range of 0.5 to 40 at. %.

EXAMPLES

The present invention is explained by the following Examples, but is not construed as limited by the Examples.

Measurement of a C/N ratio and erasability were conducted by a spectrum analyzer. Herein, the erasability is defined by the value obtained by subtracting the intensity of remaining signals at the frequency $f_1$ after overwriting from the intensity of signals at the frequency $f_1$ before overwriting in the case where on the signals recorded at a certain frequency $f_1$ (herein 6 MHz), an overwriting at another frequency $f_2$ (herein 16 MHz) is conducted.

Where the overwriting is conducted by the above-described procedure, unevenness of sizes and shapes of the recording pits formed after overwriting is represented by the intensity of remaining signals at the frequency $f_1$ after overwriting. It is why the signals overwritten at the frequency $f_2$ is cross modulated due to the influence of the recording pits in an amorphous state having formed at an interval of the frequency $f_1$. Therefore, unevenness of sizes and shapes of the recording pits after overwriting can be evaluated by measuring the erasability of the frequency $f_1$ component.

The thickness of each layer was controlled to become a predetermined thickness by measuring with a feeler type device for measuring differences in surface level, and correcting by comparison, a thin film which had been prepared by controlling the product obtained by multiplying a rate of forming the layer and time.

EXAMPLE 1

On a clean base plate of a polycarbonate provided with guide grooves, the first protective layer consisting of a pellicle of ZnS-$SiO_2$ having a thickness of 230 nm, the recording layer consisting of a pellicle of SbTeGe alloy having a thickness of 25 nm, the second protective layer of a carbon layer having a thickness of 20 nm, and further the reflective layer consisting of a pellicle of Al alloy having a thickness of 150 nm, were consecutively deposited by forming them by a sputtering method, and then the surface of the reflective layer was coated with a resin curable with ultraviolet light. Here, as an optical constant of carbon at a wavelength of 680 nm, a refractive index n thereof was 2.5, and an absorption coefficient k thereof was 0.5.

By bonding two of the thus made one-side disk with a hot-melt adhesive putting the side of the reflective layers thereof in an inner-side, a phase-change type optical disk having the structure of being adhered on the whole surfaces thereof was prepared.

Thus prepared optical disk was rotated at a linear velocity of 15 m/sec, overwriting was conducted alternately with the pulse having a pulse width of 20 nsec, and frequencies of 16 Hz and 6 Hz, and having the recorded waveform as shown in FIG. 2, and erasability at the respective frequencies was measured. Here, as each of optical values, a wave length $\lambda$ of a laser beam is 680 nm, a numerical aperture (NA) of the objective lens is 0.6, an output power of a laser beam necessary for recording, a peak power, is 13 mW, and an output power of a laser beam necessary for erasing, a bias power, is 5 mW.

Figure 6:
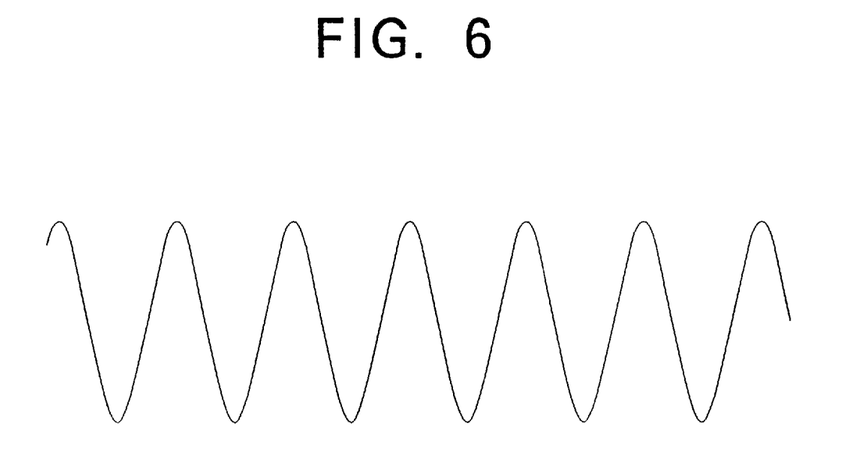
FIG. 6 is the read signals after overwriting in the optical recording medium of the present invention.

As a result, when overwriting was conducted with signals at 16 MHz on the areas where signals at 6 MHz had been recorded, a ratio of intensities of carrier to noise (hereinafter referred to as "a C/N ratio") at 16 MHz of not lower than 50 dB was obtained, and erasability of signals at 6 MHz was 28 dB, by which an improvement by 8 dB was attained as compared with that of the optical disk of Comparative Example 1 stated below. On observing the waveform therein, it was as shown in FIG. 6, and no modulation in vibrational amplitude could be seen.

Further, after a hundred of thousand times of the repeating of recording by overwriting was conducted, fluctuation of a waveform, i.e., jitter was low, and the waveform was almost the same as the initial one. An error rate of data, worsening in a byte error rate ("BER") could not be seen.

EXAMPLE 2

On a clean base plate of a polycarbonate provided with guide grooves, the first protective layer consisting of a pellicle of $ZnS-SiO_2$ having a thickness of 230 nm, the recording layer consisting of a pellicle of SbTeGe alloy having a thickness of 25 nm, the second protective layer having a thickness of 20 nm wherein 30 vol. % of W was added into a carbon, and further the reflective layer consisting of a pellicle of Al alloy having a thickness of 150 nm, were consecutively deposited by forming them by a sputtering method, and then the surface of the reflective layer was coated with a resin curable with ultraviolet light. Herein, the second protective layer wherein W was added to a carbon was formed by co-sputtering separate targets of carbon and W, and controlling each of the sputtering powers so as to contain 30 vol. % of W.

Here, as an optical constant at a wavelength of 680 nm of the second protective layer wherein W was added to a carbon, a refractive index n thereof was 2.8, and an absorption coefficient k thereof was 1.0.

By bonding two of thus made one-side disk with a hot-melt adhesive putting the side of the reflective layers thereof in an inner-side, a phase-change type optical disk having the structure of being adhered on the whole surfaces thereof was prepared.

Recording and erasing of thus prepared optical disk were conducted in a method as shown in Example 1, and a C/N ratio and erasability thereof were measured. As a result, on overwriting with signals at 16 MHz on the areas where signals at 6 MHz had been recorded, a C/N ratio at 16 MHz of not lower than 50 dB was obtained, and erasability of signals at 6 MHz was 32 dB, by which an improvement by 12 dB was attained as compared with that of the optical disk of Comparative Example 1 stated below. On observing the waveform therein, it was as shown in FIG. 6, and no modulation in vibrational amplitude could be seen.

EXAMPLE 3

On a clean base plate of a polycarbonate provided with guide grooves, the first protective layer consisting of a pellicle of $ZnS-SiO_2$ having a thickness of 230 nm, the recording layer consisting of a pellicle of SbTeGe alloy having a thickness of 25 nm, the second protective layer having a thickness of 20 nm wherein 30 vol. % of Mo was added to a carbon, and further the reflective layer consisting of a pellicle of Al alloy having a thickness of 150 nm, were consecutively deposited by forming them by a sputtering method, and then the surface of the reflective layer was coated with a resin curable with ultraviolet light. Herein, the layer wherein Mo was added into a carbon was formed by co-sputtering separate targets of carbon and Mo, and controlling each of the sputtering powers so as to contain 30 vol. % of Mo.

Here, as an optical constant at a wavelength of 680 nm of the second protective layer wherein Mo was added into a carbon, a refractive index n thereof was 2.7, and an absorption coefficient k thereof was 0.8.

By bonding two of thus made one-side disk with a hot-melt adhesive putting the side of the reflective layers thereof in an inner-side, a phase-change type optical disk having the structure of being adhered on the whole surfaces thereof was prepared.

Recording and erasing of thus prepared optical disk were conducted in a method as shown in Example 1, and a C/N ratio and erasability thereof were measured. As a result, when overwriting was conducted with signals at 16 MHz on the areas where signals at 6 MHz had been recorded, a C/N ratio at 16 MHz of not lower than 50 dB was obtained, and erasability of signals at 6 MHz was 31 dB, by which an improvement by 11 dB was attained as compared with that of the optical disk of Comparative Example 1 stated below. When a waveform therein was observed, the waveform as shown in FIG. 6 was observed, and no modulation in vibrational amplitude could be seen.

EXAMPLE 4

On a clean base plate of a polycarbonate provided with guide grooves, the first protective layer consisting of a pellicle of $ZnS-SiO_2$ having a thickness of 230 nm, the recording layer consisting of a pellicle of SbTeGe alloy having a thickness of 25 nm, the second protective layer of an $AlN_x$ layer having a thickness of 20 nm, and further the reflective layer consisting of a pellicle of Al alloy having a thickness of 150 nm, were consecutively deposited by forming them by a sputtering method, and then the surface of the reflective layer was coated with a resin curable with ultraviolet light. Herein, the $AlN_x$ layer was formed by a reactive-sputtering method wherein an Al target was used and a nitrogen gas was flown during the sputtering. The flow rate of a nitrogen gas was controlled so that an absorption coefficient k of the $AlN_x$ layer at a wavelength of 680 nm became 1.0. Here, a refractive index n thereof was 2.7, and an absorption coefficient k thereof was 0.8.

By bonding two of the thus made one-side disk with a hot-melt adhesive putting the side of the reflective layers thereof in an inner-side, a phase-change type optical disk having the structure of being adhered on the whole surfaces thereof was prepared.

Recording and erasing of the thus prepared optical disk were conducted in a method as shown in Example 1, and a C/N ratio and erasability thereof were measured. As a result, when overwriting was conducted with signals at 16 MHz on the areas where signals at 6 MHz had been recorded, a C/N ratio at 16 MHz of not lower than 50 dB was obtained, and erasability of signals at 6 MHz was 32 dB, by which an improvement by 12 dB was attained as compared with that of the optical disk of Comparative Example 1 stated below. When a waveform therein was observed, the waveform as shown in FIG. 6 was observed, and no modulation in vibrational amplitude could be seen.

Comparative Example 1

On a clean base plate of a polycarbonate provided with guide grooves, the first protective layer consisting of a pellicle of $ZnS-SiO_2$ having a thickness of 230 nm, the recording layer consisting of a pellicle of SbTeGe alloy having a thickness of 25 nm, the second protective layer of a $ZnS-SiO_2$ layer having a thickness of 20 nm, and further the reflective layer consisting of a pellicle of Al alloy having a thickness of 150 nm, were consecutively deposited by forming them by a sputtering method, and then the surface of the reflective layer was coated with a resin curable with ultraviolet light. Here, as an optical constant at a wavelength of 680 nm of the $ZnS-SiO_2$ layer used as the second protective layer, a refractive index n thereof was 2.1, and an absorption coefficient k thereof was 0.

By bonding two of the thus made one-side disk with a hot-melt adhesive putting the side of the reflective layers thereof in an inner-side, a phase-change type optical disk having the structure of being adhered on the whole surfaces thereof was prepared.

Figure 7:
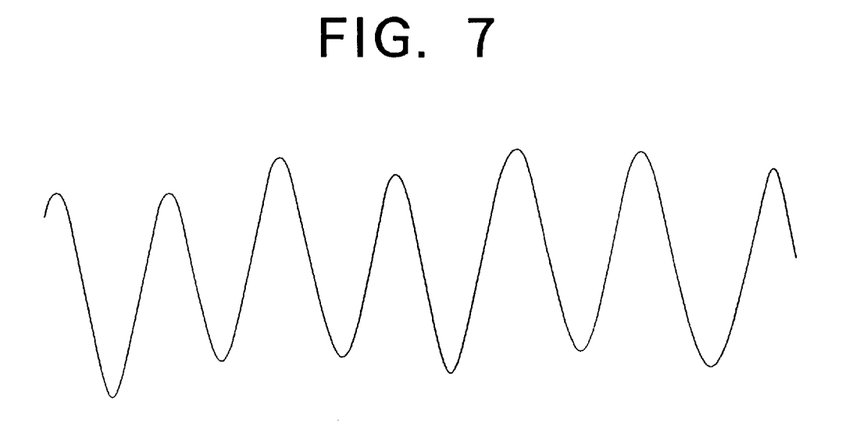
FIG. 7 is the read signals after overwriting in the optical recording medium of prior art.

Recording and erasing of the thus prepared optical disk were conducted in a method as shown in Example 1, and a C/N ratio and erasability thereof were measured. As a result, when overwriting was conducted with signals at 16 MHz on the areas where signals at 6 MHz had been recorded, a C/N ratio at 16 MHz was not lower than 50 dB, but erasability of signals at 6 MHz was 20 dB. When a waveform was observed, modulation in vibrational amplitude at a frequency of 6 MHz as shown in FIG. 7 could be seen.

Apparently, it has turned out that sizes and shapes of pits formed after overwriting are not uniform depending upon the states of the recording layer before overwriting (a non-recorded portion in a crystalline state and a recording pit in an amorphous state).

Comparative Example 2

On a clean base plate of a polycarbonate provided with guide grooves, the first protective layer consisting of a pellicle of $ZnS-SiO_2$ having a thickness of 230 nm, the recording layer consisting of a pellicle of SbTeGe alloy having a thickness of 25 nm, the second protective layer having a thickness of 20 nm consisting of a layer wherein 57 vol. % of Pd was added to $ZnS-SiO_2$, and further the reflective layer consisting of a pellicle of Al alloy having a thickness of 150 nm, were consecutively deposited by forming them by a sputtering method, and then the surface of the reflective layer was coated with a resin curable with ultraviolet light. Herein, the second protective layer wherein Pd was added to $ZnS-Si_2$ was formed by sputtering a mixed target of $ZnS-SiO_2$ and Pd. The mixed target of $ZnS-SiO_2$ and Pd was a material obtained by controlling the composition so that Pd is mixed with $ZnS-SiO_2$ in a ratio of 57 vol. %. As an optical constant at a wavelength of 680nm of the second protective layer, a refractive index n thereof was 4.0, and an absorption coefficient k thereof was 3.1.

By bonding two of the thus made one-side disk with a hot-melt adhesive putting the side of the reflective layers thereof in an inner-side, a phase-change type optical disk having the structure of being adhered on the whole surfaces thereof was prepared.

Recording and erasing of the thus prepared optical disk were conducted in a method as shown in Example 1, and erasability thereof was measured. As a result, when overwriting was conducted with signals at 16 MHz on the areas where signals at 6 MHz had been recorded, erasability of signals at 6 MHz was 20 dB. When a waveform was observed, modulation in vibrational amplitude at a frequency of 6 MHz as shown in FIG. 7 could be seen. Apparently, it has turned out that sizes and shapes of pits formed after overwriting are not uniform depending upon the states of the recording layer before overwriting.

Comparative Example 3

On a clean base plate of a polycarbonate provided with guide grooves, the first protective layer consisting of a pellicle of $ZnS-SiO_2$ having a thickness of 230 nm, the recording layer consisting of a pellicle of SbTeGe alloy having a thickness of 25 nm, the second protective layer of a carbon layer having a thickness of 100 nm, and further the reflective layer consisting of a pellicle of Al alloy having a thickness of 150 nm, were consecutively deposited by forming them by a sputtering method, and then the surface of the reflective layer was coated with a resin curable with ultraviolet light. Here, as an optical constant at a wavelength of 680 nm of the carbon layer used as the second protective layer, a refractive index n thereof was 2.5, and an absorption coefficient k thereof was 0.5.

By bonding two of the thus made one-side disk with a hot-melt adhesive putting the side of the reflective layers thereof in an inner-side, a phase-change type optical disk having the structure of being adhered on the whole surfaces thereof was prepared.

Recording and erasing of the thus prepared optical disk were conducted in a method as shown in Example 1, and a C/N ratio thereof was measured. As a result, when overwriting was conducted with signals at 16 MHz on the areas where signals at 6 MHz had been recorded, a C/N ratio at 16 MHz of only 44 dB was obtained. This is thought to be caused by the decrease in an optical contrast since the thickness of a carbon layer as the second protective layer was made thick.

INDUSTRIAL APPLICABILITY

According to the present invention, in a rewritable phase-change type optical recording medium having a structure in which the first protective layer, a recording layer, the second protective layer, and a reflective layer are consecutively deposited in this order on a transparent substrate, by adopting the thickness of the first protective layer in the range of the thickness, where reflectivity of light on irradiating the layer from the side of the transparent substrate exhibits minimum, ±30 nm, and adopting an absorption coefficient k of the second protective layer in the range of $0.05 \leq k \leq 2.5$, unevenness of shapes and sizes of the recording pits can be reduced, irrespective of whether the state of the recording layer is crystalline or amorphous.

Resultantly, the present invention can provide an optical recording medium having an improvement in erasability and reduction of jitter, and having excellent error rate.

We claim:

1. A phase-change type optical recording medium, wherein
   (1) recording, erasing and reading of information by irradiating light is possible, and the medium has a structure in which the first protective layer, a recording layer, a second protective layer, and a reflective layer are consecutively deposited in this order on a transparent substrate,
   (2) the thickness of the first protective layer is in the range of the thickness, of 70±30 nm or 230±30 mn,
   (3) the second protective layer has the absorption coefficient k satisfying the following equation:

$$0.05 \leq k \leq 2.5, \text{ and}$$

(4) the recording layer has a thickness in the range of from 10 nm to 50 nm.

2. The optical recording medium according to claim 1, wherein the thickness of the second protective layer is in the range of 2 nm to 40 nm.

3. The optical recording medium according to claim 2, wherein the recording layer comprises as a main component therein at least one an alloy selected from the group consisting of an alloy of Sb-Te-Ge, an alloy of In-Sb, an alloy of In-Sb-Te and an alloy of In-Se.

4. The optical recording medium according to claim 2, wherein the thickness of the recording layer is in the range of 10 nm to 50 nm.

5. The optical recording medium according to claim 2, wherein the first protective layer is made of at least one component selected from the group consisting of ZnS, $SiO_2$, SiO, $Al_2O_3$, MgO, $Si_3N_4$, AlN, $MgF_2$, SiC and ZnS-$SiO_2$.

6. The optical recording medium according to claim 2, wherein the second protective layer is made of carbon.

7. The optical recording medium according to claim 2, wherein the second protective layer is made of a material obtained by adding to carbon at least one metal or semimetal selected from the group consisting of Al, Ag, W, Ti, Mo, Ni, Pt, Cr, Pd, V, Tc, Nb, Ta, Re, and Ir.

8. The optical recording medium according to claim 2, wherein the second protective layer is made of an aluminum nitride.

9. The optical recording medium according to claim 2, wherein the second protective layer is made of a material obtained by adding a metal or semimetal to a sulfide, an oxide, a nitride, a fluoride, a carbide, or a mixture thereof.

10. The optical recording medium according to claim 9, wherein the metal or semimetal is at least one selected from the group consisting of Al, Ag, W, Ti, Mo, Ni, Pt, Cr, Pd, V, C, B, PbS, PbSe, PbTe and $Mg_2Sn$.

11. The optical recording medium according to claim 1, wherein the second protective layer is made of carbon.

12. The optical recording medium according to claim 1, wherein the second protective layer is made of a material obtained by adding to carbon at least one metal or semimetal selected from the group consisting of Al, Ag, W, Ti, Mo, Ni, Pt, Cr, Pd, V, Tc, Nb, Ta, Re, and Ir.

13. The optical recording medium according to claim 1, wherein the second protective layer is made of an aluminum nitride.

14. The optical recording medium according to claim 1, wherein the second protective layer is made of a material obtained by adding a metal or semimetal to a sulfide, an oxide, a nitride, a fluoride, a carbide, or a mixture thereof.

15. The optical recording medium according to claim 14, wherein the metal or semimetal is at least one selected from the group consisting of Al, Ag, W, Ti, Mo, Ni, Pt, Cr, Pd, V, C, B, PbS, PbSe, PbTe and $Mg_2Sn$.

* * * * *